United States Patent [19]
Hoffman

[11] Patent Number: 5,361,587
[45] Date of Patent: Nov. 8, 1994

[54] VAPOR-COMPRESSION-CYCLE REFRIGERATION SYSTEM HAVING A THERMOELECTRIC CONDENSER

[75] Inventor: Douglas V. Hoffman, Pearl River, N.Y.

[73] Assignee: Paul Georgeades, Palm Harbor, Fla.

[21] Appl. No.: 65,769

[22] Filed: May 25, 1993

[51] Int. Cl.⁵ .......................... F25B 21/02; F25B 7/00
[52] U.S. Cl. .......................................... 62/3.2; 62/335
[58] Field of Search ................ 62/3.2, 335, 238.6, 62/3.61, 3.63, 79

[56] References Cited

U.S. PATENT DOCUMENTS

| | | | |
|---|---|---|---|
| 2,806,358 | 9/1957 | Jacobs | 62/244 X |
| 3,148,511 | 9/1964 | Gable | 62/3.2 |
| 3,874,183 | 4/1975 | Tabet | 62/3.61 |

*Primary Examiner*—William E. Wayner
*Attorney, Agent, or Firm*—Abdallah & Muckelroy

[57] ABSTRACT

A vapor-compression-cycle refrigeration system that utilizes Peltier cooling to condense high-pressure gaseous refrigerant. The Peltier condenser of the present invention includes a thermoelectric module which contacts at its cold side the gaseous refrigerant from the compressor and withdraws heat from the refrigerant to fins disposed on the hot side of the thermoelectric module.

14 Claims, 3 Drawing Sheets

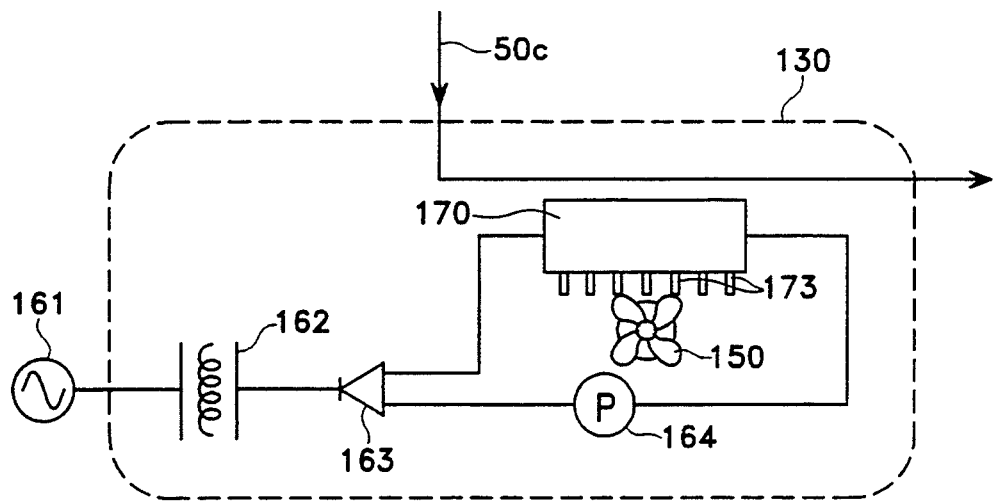
FIG. 3
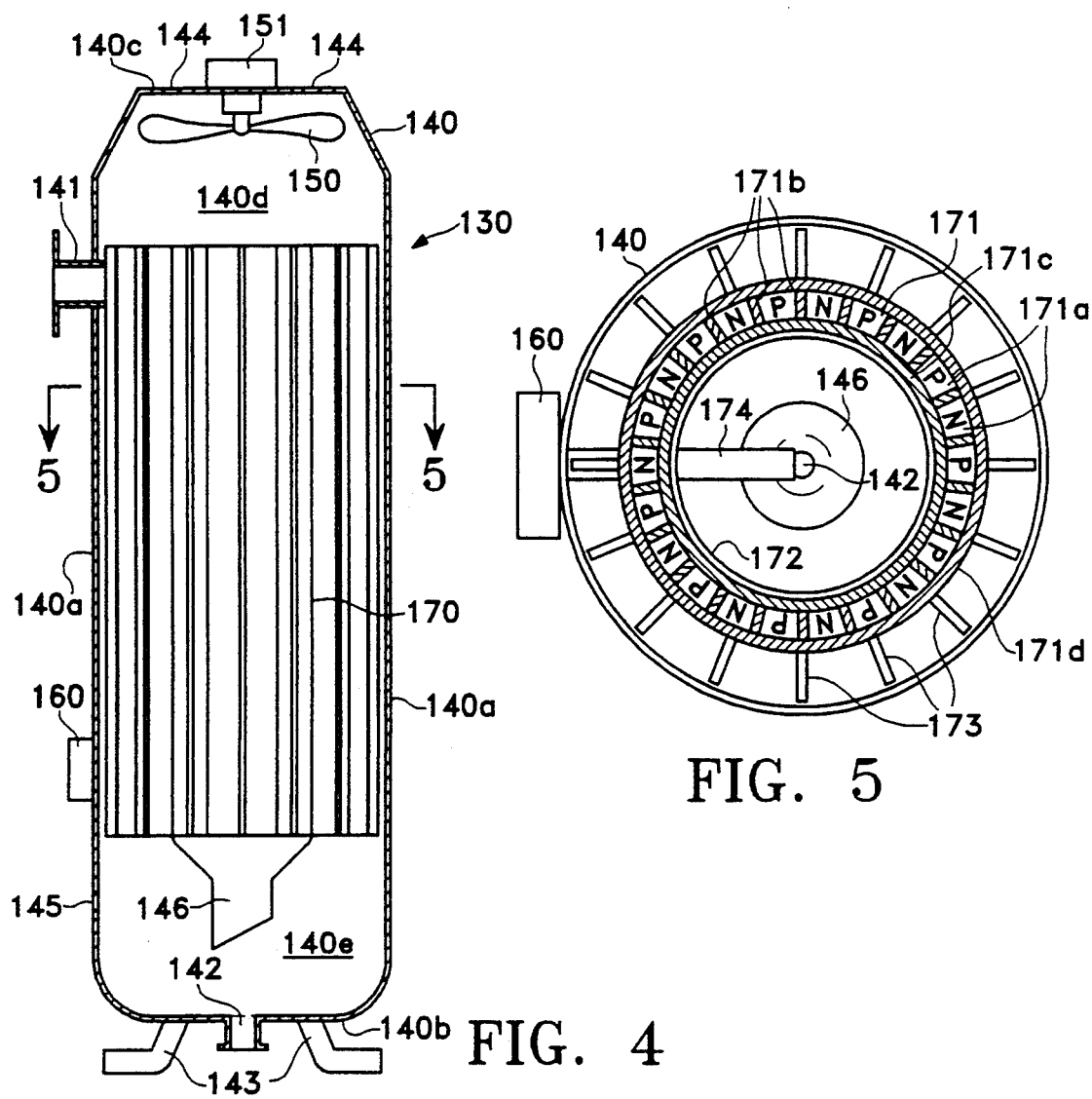
FIG. 4
FIG. 5

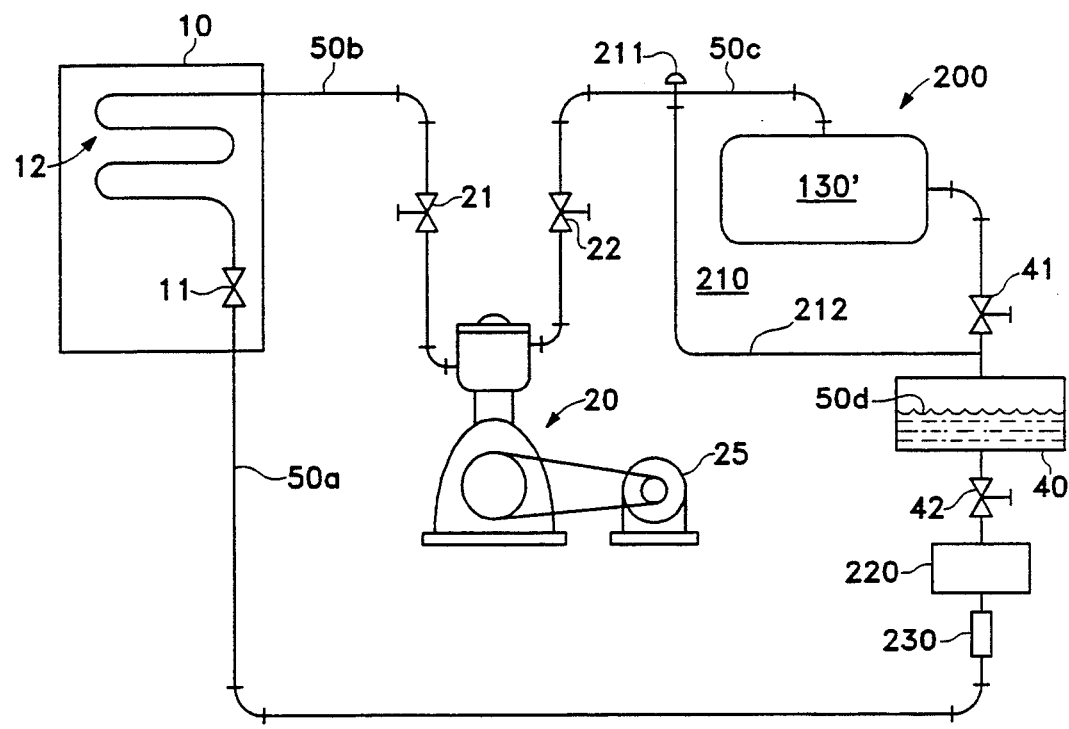
FIG. 6
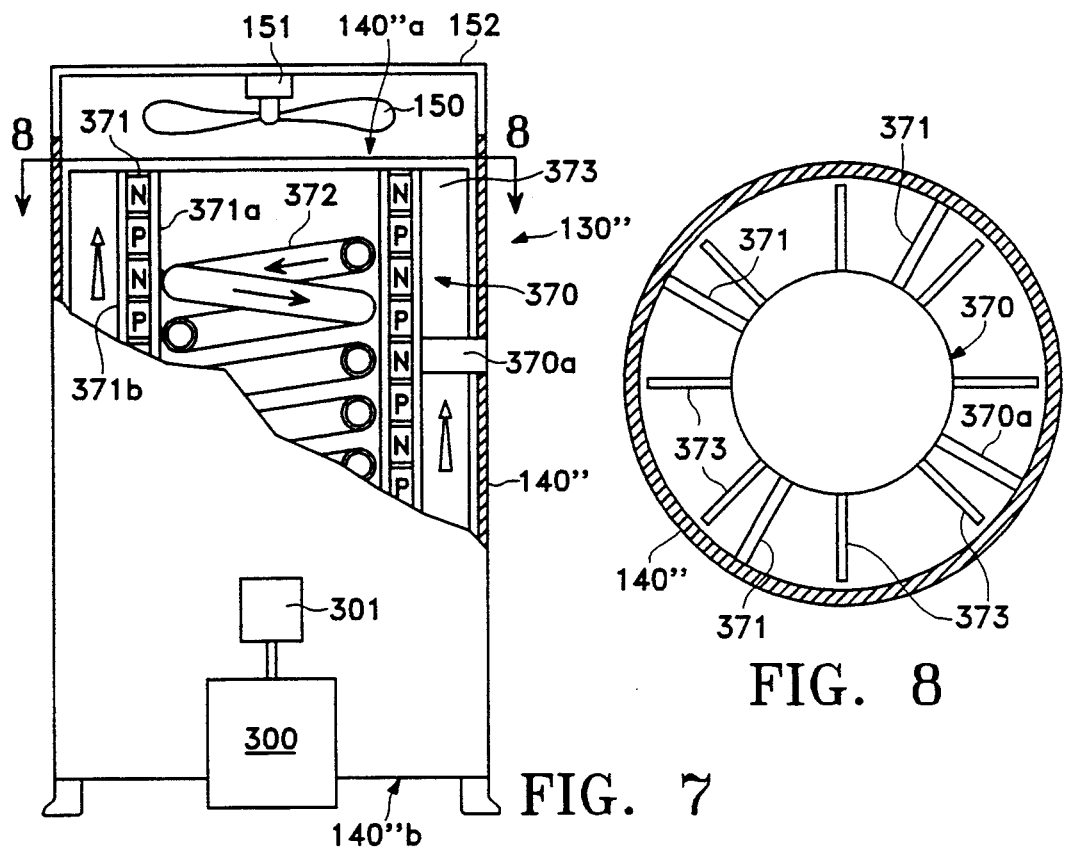
FIG. 7
FIG. 8

VAPOR-COMPRESSION-CYCLE REFRIGERATION SYSTEM HAVING A THERMOELECTRIC CONDENSER

BACKGROUND OF THE INVENTION

The present invention generally relates to refrigeration systems. More particularly, this invention relates to a vapor-compression-cycle refrigeration system having a Peltier condenser.

Vapor-compression-cycle refrigeration systems, widely known in the art, generally comprise an evaporator in which liquid refrigerant boils at low temperature to produce cooling, a compressor which raises the pressure and temperature of the gaseous refrigerant, a condenser in which the refrigerant discharges its heat to the environment, a receiver which stores the liquid condensed in the condenser, and an expansion valve through which the liquid refrigerant expands from the high-pressure level in the condenser to the low-pressure level in the evaporator. Prior art condensers for vapor-compression-cycle refrigerators may be air-cooled for small- and medium-capacity cooling, or water-cooled, as in shell-and-tube, shell-and-coil, or double-pipe type condensers, for large capacity cooling.

Air-cooled condensers are limited by fluctuations in the temperature of ambient air used to cool the refrigerant. Higher ambient air temperature reduces the cooling capacity of the condenser. Compressor efficiency is thereby decreased and the compressor is required to run longer, increasing the load on the compressor motor and the electricity requirements. Furthermore, the life of the compressor is therefore reduced as a result of temperature fluctuations in ambient air. Air-cooled condensers also become less efficient as heat is extracted from the refrigerant since ambient temperature determines the rate of heat extraction and becomes hotter as heat is withdrawn from the refrigerant. Evaporator condensers, a device combining a condensing coil and a forced-draft cooling tower in a single unit, are also known in the prior art.

In large capacity refrigeration systems, particularly commercial refrigeration systems utilizing water-cooled condensers, large quantities of condensing water are required to discharge heat from the high pressure gaseous refrigerant. These large amounts of water are often wasted to a drain or the like. In many locales water is a scarce and expensive commodity and its use may be limited by law. To prevent this wastage of water, cooling towers and spray ponds are commonly used to re-cool water for reuse. Cooling towers and spray ponds greatly increase the maintenance requirements of a refrigeration system and may require the addition of water treatment facilities. Thermal pollution of lakes and streams has been known to occur where systems of this type are utilized. Water-cooled condensers also become less efficient over time due to corrosive particles generally found in tap water. Rupture problems are also common for water-cooled condensers which results in contamination and water-fouling problems. Such problems shorten the life of a refrigeration system and result in the use of even greater amounts of water.

To overcome the above-mentioned limitations of prior art refrigeration systems utilizing air-cooled and water-cooled condensers the present invention discloses a vapor-compression-cycle refrigeration system utilizing thermoelectric cooling in the condenser.

Thermoelectric cooling, more widely referred to as Peltier cooling, is known in the prior art. However, the Peltier cooling systems of the prior art generally operate by providing means to directly cool the interior of a cooling chamber (in lieu of the evaporator in vapor-compression-cycle refrigeration systems) using the Peltier effect of semiconductors. In the prior art, Peltier cooling is generally understood as a more expensive and less efficient alternative to standard vapor-compression-cycle refrigerators. Their use is largely restricted to situations in which lower maintenance, increased life, or quiet performance are essential, or in situations, such as in space vehicles or artificial satellites, in which the vapor-compression-cycle refrigerators are impractical.

Peltier cooling is also known in the art for localized cooling of electronic components, such as integrated circuits, power transistors, lasar diode IR detectors and solid state imaging devices, for use in Peltier thermostats in precision radiometers and photometers, and for cooling moderate volumes of air or other gases to serve the same function as the evaporator coil in a conventional air-conditioner design.

U.S. Pat. No. 3,037,358 to Scofield and U.S. Pat. No. 3,073,126 to Staebler disclose a refrigeration apparatus in an air conditioner that makes ice by Peltier cooling as an auxiliary function. Integrated comfort conditioning systems are shown in U.S. Pat. Nos. 3,403,723 and 3,488,971 to Meckler which include Peltier cooling for transferring heat to circulating water. U.S. Pat. No. 4,290,273 to Meckler discloses a chiller and heat pump system that employs a Peltier effect diffusion still.

No prior art reference known to the Applicant discloses or suggests a vapor-compression-cycle refrigerator that incorporates Peltier cooling to discharge heat from a gaseous refrigerant for condensation of the refrigerant.

SUMMARY OF THE INVENTION

The present invention is a vapor-compression-cycle refrigeration system that includes a condenser made operative by Peltier cooling to condense high-pressure gaseous refrigerant. The refrigeration system of the present invention includes in series an evaporator, a motor-driven compressor, a Peltier condenser, and a receiver. The Peltier condenser generally comprises a thermoelectric element having the gaseous refrigerant passing over the cold side of the thermoelectric element and dissipating heat from the hot side of the thermoelectric element.

A primary object of the present invention is to eliminate the large water requirements and concomitant problems of conventional water-cooled vapor-compression-cycle refrigeration systems.

Another object of the present invention is to provide a vapor-compression-cycle refrigeration system that can be operated at a lower cost by eliminating condensing water costs and rupture and contamination problems.

It is also an object of the present invention to provide a more efficient manner of condensing gaseous refrigerant in a vapor-compression-cycle refrigeration system.

A further object of the present invention is to provide a vapor-compression-cycle refrigeration system having superior environmental characteristics.

These and other objects and advantages of the present invention will be apparent to those skilled in the art from the following description of preferred embodiments, drawings and appended claims.

BRIEF DESCRIPTION OF THE DRAWINGS

FIG. 3 is a schematic diagram of the Peltier condenser of the present invention.

FIG. 4 is vertical cross-sectional view of a first preferred embodiment of the Peltier condenser of the present invention.

FIG. 5 is a lateral cross-sectional view of the first Peltier condenser taken along line 5—5 of FIG. 4.

FIG. 6 is a schematic diagram of a second preferred embodiment of a vapor-compression-cycle refrigeration system in accordance with the teachings of the present invention.

FIG. 7 is a partially fragmented vertical cross-sectional view of a third preferred embodiment of the Peltier condenser of the present invention.

FIG. 8 is a lateral cross-sectional view of the third Peltier condenser taken along line 8—8 of FIG. 7.

DESCRIPTION OF PREFERRED EMBODIMENTS

Figure 1:
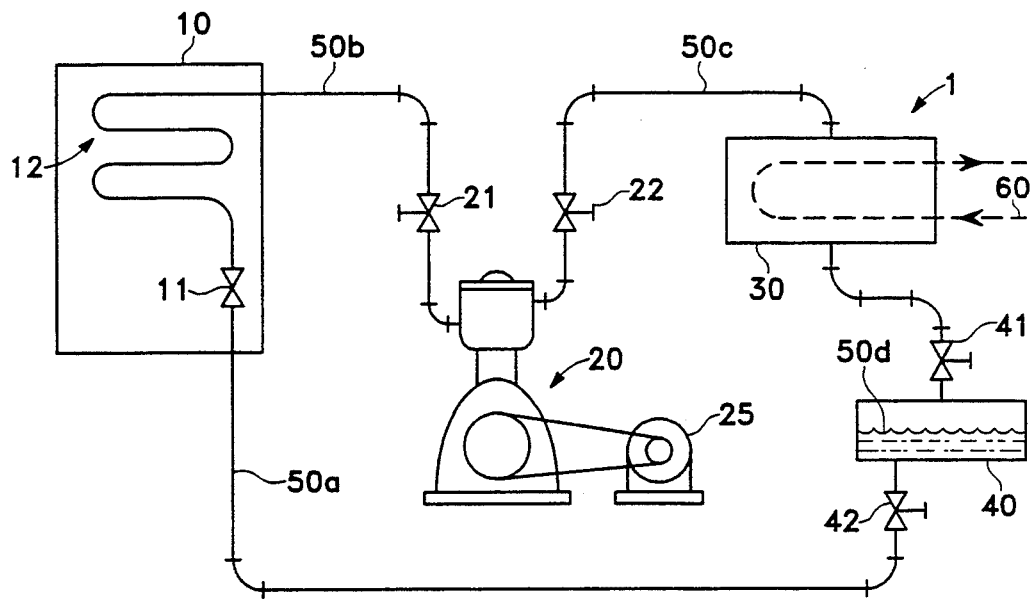
FIG. 1 is a schematic diagram of the conventional vapor-compression-cycle refrigeration system.

FIG. 1 illustrates in a schematic diagram the vapor-compression-cycle refrigerator 1 known in the prior art. The conventional vapor-compression-cycle refrigerator 1 includes, in series, an evaporator 10, a compressor 20 driven by motor 25, a condenser 30, and a receiver 40. Evaporator 10 includes an expansion valve 11 through which high-pressure liquid refrigerant 50a is fed to an evaporator coil 12. Heat from the space that is to be cooled boils the liquid refrigerant 50a at low temperature to produce cooling. Low-pressure gaseous refrigerant 50b is released from evaporator 10 and fed to compressor 20 through a compressor inlet valve 21 to raise the pressure and temperature of the gaseous refrigerant 50b. High-pressure gaseous refrigerant 50c is then fed from compressor 20 through compressor outlet valve 22 to condenser 30. In the condenser 30 the high-pressure gaseous refrigerant 50c discharges its heat to the environment through heat exchange with condensing water 60 fed through condenser 30. Thereby the high-pressure gaseous refrigerant 50c is condensed. The condensed liquid 50d is fed from condenser 30 through receiver inlet valve 41 to receiver 40 wherein the condensed liquid 50d is stored and subsequently fed from receiver 40 through a receiver outlet valve 42 to the expansion valve 11 of the evaporator 10. The cycle is thereafter repeated to maintain a predetermined temperature.

Figure 2:
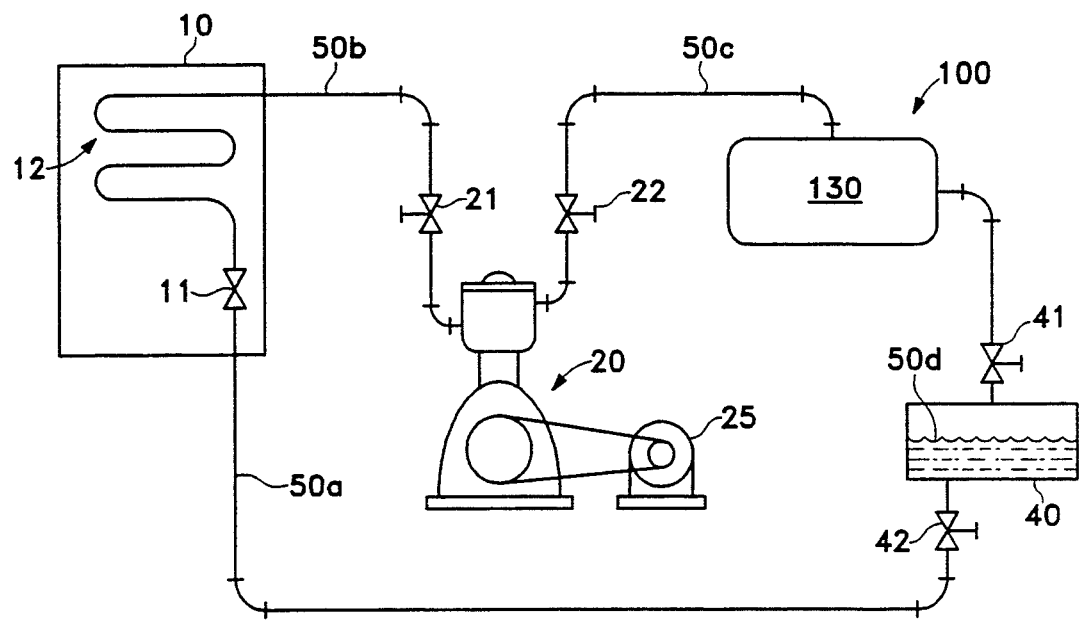
FIG. 2 is a schematic diagram of a first preferred embodiment of a vapor-compression-cycle refrigeration system constructed in accordance with the teachings of the present invention.

A schematic diagram of the Peltier vapor-compression-cycle refrigerator 100 of the present invention is illustrated in FIG. 2. Peltier refrigerator 100 comprises substantially the same components as shown and described for the conventional vapor-compression cycle refrigerator 1 illustrated in FIG. 1, the exception being the provision of a Peltier condenser 130 in lieu of the standard condenser 30 known in the prior art. As can be seen in FIG. 2 no condensing water 60 is needed for operation of the Peltier condenser 130 of the present invention. Peltier condenser 130 will hereinafter be described in greater detail.

A condenser is a device in which the heat removed in the process of converting a vapor to liquid is transferred to a coolant. Two types of condensers are known in the art: an indirect or surface condenser, and a direct contact condenser. In an indirect condenser a thin wall separates the coolant from the vapor and its condensate, and heat passes through this wall. In a direct contact condenser, the vapor and coolant are mixed together and the heat transfers directly into the coolant. The Peltier condenser 130 in the present vapor-compression-cycle refrigerator 100, like the standard condenser 30 illustrated in FIG. 1 for the conventional vapor-compression-cycle refrigerator 1, is an indirect or surface condenser.

FIG. 3 illustrates in a schematic diagram the primary components of the Peltier condenser 130 of the present invention. Peltier condenser 130 generally comprises an AC power source 161, an AC-DC (step-down) transformer 162, a rectifier 163, a potentiometer thermostat 164, a finned thermoelectric module 170 and a draft fan 150. High-pressure gaseous refrigerant 50c enters the Peltier condenser 130 and flows past the cold side of the thermoelectric module 170. Heat is withdrawn from the high-pressure gaseous refrigerant 50c to heat sink fins 173 disposed on the hot side of the module 170 to condense the gaseous refrigerant 50c. The heat withdrawn is then dissipated to the environment by operation of the draft fan 150.

A first preferred embodiment of the Peltier condenser 130 of the present invention is shown in FIGS. 4 and 5. FIG. 4 is a vertical cross-sectional view of first Peltier condenser 130. First Peltier condenser 130 is a free-standing unit that substantially comprises (a) a shell 140 having a gaseous refrigerant inlet 141 formed in an upper portion of a side wall 140a of shell 140 and a condensate outlet 142 formed in the bottom wall 140b of the shell 140; (b) a draft fan 150 driven by draft fan motor 151 disposed in a top wall 140c of the shell 140; (c) an electrical control box 160 disposed on a side wall 140a of shell 140 which houses the transformer 162, rectifier 163, potentiometer thermostat 164 and other electrical wiring and control circuitry; (d) a thermoelectric module 170 disposed in an interior portion 140d of shell 140; and (e) support legs 143 attached to the bottom wall 140b of shell 140. Ambient air inlets 144 are formed in the top wall 140c of shell 140 to provide means for entry of ambient air into the interior portion 140d of shell 140, and an air oulet 145 is provided for air egress after cooling of the heat sink fins 173 as hereinafter described.

Further details of the Peltier condenser 130 of the present invention can be better understood by reference to the lateral cross-sectional view of condenser 130 illustrated in FIG. 5. Therein it can be seen that shell 140, preferably formed from steel, is constructed having a circular lateral cross-section. The thermoelectric module 170 disposed within the shell interior portion 140d preferably comprises a circular array of thermocouples 171 consisting of P and N type thermoelectric elements 171a electrically and thermally insulated from each other, as known in the art, by insulators 171b disposed between the respective thermoelectric elements 171a, a cold plate 171c disposed to the interior side of the thermoelectric elements 171a, and a hot plate 171d disposed to the exterior side of the thermoelectric elements 171a. The number of thermocouple arrays 171 and the particular materials selected for the thermoelectric elements 171a will vary depending upon the design parameters of the Peltier condenser 130. A refrigerant conduit 172, preferably formed from aluminum or copper tubing, is disposed in thermal contact with the cold plate 171c of the thermocouples 171 for receipt of the high-pressure gaseous refrigerant 50c. To protect the condenser 130 from air and moisture fatigue it is preferred that a vacuum be maintained within conduit 172 and all interior portions of condenser 130. An array of heat sink fins 173 are circumferentially attached to the hot plate 171d of the thermocouples 171. Fins 173 are preferably formed from steel and the number and structural configuration of the fins 173 will vary depending on the design parameters of the Peltier condenser 130. First Peltier condenser 130 further includes a thermostat well 174 that extends approximately to the center of the refrigerant conduit 172 for receipt of a thermostat probe (not shown) which connects to electrical control components disposed in the control box 160. Thermostat probe operates to monitor the temperature of fluid in the conduit 172 and to shut down the thermoelectric modules 170 when pre-set limits are reached or exceeded.

During operation of the Peltier condenser 130 of the present invention high-pressure gaseous refrigerant 50c enters the refrigerant conduit 172 via inlet 141 and is condensed therein by operation of the thermocouples 171. The condensate falls to the bottom portion 140e of shell 140 through a funnel separator 146. Ambient air is blown across the heat sink fins 173 of the thermoelectric module 170 by draft fan 150 to discharge the heat removed from the high-pressure gaseous refrigerant 50c during Peltier-cooling condensation. The condensate is removed from condenser 130 to receiver 40 via the condensate outlet 142.

While a single thermoelectric module 170 is shown in the first preferred embodiment of the Peltier condenser 130 of the present invention, it should be readily understood that a plurality of single-module condensers 130, or a Peltier condenser consisting of a plurality of thermoelectric modules 170 disposed in parallel displacement within the condenser shell 140 may be utilized. Furthermore, the cylindrical shape of Peltier condenser 130 is shown for illustration purposes only and should not be construed as a limitation of the present invention.

A schematic diagram of a second preferred embodiment of a vapor-compression-cycle refrigeration system 200 constructed in accordance with the teachings of the present invention is illustrated in FIG. 6. Second vapor-compression-cycle refrigeration system 200 utilizes a second Peltier condenser 130' constructed substantially similar to the Peltier condenser previously shown and described. Second Peltier condenser 130' is formed without a thermostat well 174 (FIG. 5) for receipt of a thermostat probe as heretofore described. In lieu of a thermostat probe for maintenance of proper condensing temperature in the condenser, second system 200 includes a hot gas by-pass piping assembly 210 to control the condensing temperature. As can be seen in FIG. 6, second system 200 includes an evaporator 10, a compressor 20, said second Peltier condenser 130', a receiver 40, a filter drier 220, a sight glass 230 and said hot gas by-pass piping assembly 210. Hot gas by-pass assembly 210 substantially comprises a head pressure control valve 211 connected between compressor 20 and second Peltier condenser 130', and by-pass piping 212 connected between the head pressure control valve 211 and the receiver 40. Head pressure control valve 211 is preferably a pressure-controlled valve sensitive to temperature changes in gaseous refrigerant 50c and operates to selectively direct the flow of gaseous refrigerant 50c between the second condenser 130' and receiver 40 based on pre-set temperature limits for condensation.

A partially fragmented vertical cross-sectional view of a third preferred embodiment of a Peltier condenser 130" constructed in accordance with the teachings of the present invention is illustrated in FIG. 7. Third Peltier condenser 130" is a free-standing unit having a remote condenser power source 300. Remote condenser power source 300 is preferably a remote AC-DC switching power supply ("power pack") electrically connected to a potentiometer thermostat 301 disposed on an outside portion of the third Peltier condenser 130". Third Peltier condenser 130" includes a selectively removable shroud 140" having an open top end 140"a and an open bottom end 140"b. A draft fan 150 driven by draft fan motor 151 is attached to a fan bracket 152 disposed on a top wall of shroud 140". A second thermoelectric module 370 is disposed in an interior portion of shroud 140" and is secured to shroud 140" by module braces 370a. By having shroud 140" selectively removable second thermoelectric module 370 can be more readily accessed for cleaning and maintenance and as will be better understood hereinafter shroud 140" serves as a diverter for ambient air used to remove heat from third Peltier condenser 130".

Second thermoelectric module 370 includes a spiraled refrigerant conduit 372, preferably formed from aluminum or copper tubing and spiraled to obtain a greater heat transfer area within module 370. Spiraled conduit 372 is disposed along its length in thermal contact with the cold plate 371a of thermoelectric module 370 adjacent the cold juncture of an array of thermoelectric elements 371. The hot plate 371b of the thermoelectric module 370 is disposed adjacent the hot juncture of the array of thermoelectric elements 371. Heat sink fins 373 circumferentially attached to hot plate 371b extend in close proximity to the inner wall of shroud 140". Activation of the thermoelectric elements 371 condenses refrigerant flowing through the spiraled conduit 372 and draft fan 150 removes the heat transferred to fins 373 from third Peltier condenser 130".

Various changes, additions and modifications may be made to the foregoing preferred embodiments of the present invention without departing from the spirit and scope of the present disclosure. Such changes, additions and modifications within a fair reading of the appended claims are intended as part of this invention. It should also be understood that while the present invention has been described as a vapor-compression-cycle refrigerator, the terms "refrigerator" and "refrigeration system" as used herein equally apply to air conditioning and refrigeration equipment.

Therefore, in view of the foregoing, I claim:

1. A vapor-compression-cycle refrigeration system comprising
   an evaporator coil,
   a compressor,
   a Peltier condenser,
   an expansion valve,
   said evaporator coil, compressor, Peltier condenser and expansion valve being connected in series,
   a receiver disposed between said Peltier condenser and said expansion valve, and
   condensing temperature control means.

2. An improvement in a vapor-compression-cycle refrigeration system of the type consisting of an evaporator, a compressor, refrigerant condensing means and a receiver, said evaporator, compressor, refrigerant condensing means and receiver being connected in series, the improvement comprising refrigerant condensing means consisting of a Peltier condenser wherein said Peltier condenser comprises a step-down transformer connected in series to a rectifier, said rectifier being connected in series to a potentiometer thermostat and a finned thermoelectric module, and a draft fan disposed adjacent to fins of said thermoelectric module, 3. An improvement in a vapor-compression-cycle refrigeration system of the type consisting of an evaporator, a compressor, refrigerant condensing means and a receiver, said evaporator, compressor, refrigerant condensing means and receiver being connected in series, the improvement comprising refrigerant condensing means consisting of a Peltier condenser wherein said Peltier condenser comprises (a) a free-standing shell having a gaseous refrigerant inlet formed in an upper portion of a side wall of the shell and a condensate outlet formed in a bottom wall of the shell;

(b) a draft fan driven by a draft fan motor disposed in a top wall of the shell;

(c) an electrical control box disposed on a side wall of the shell, said shell housing a transformer, a rectifier, a potentiometer thermostat and electrical wiring and control circuitry; and (d) a thermoelectric module disposed in an interior portion of the shell.

4. An improvement in a vapor-compression-cycle refrigeration system as in claim 3 wherein said thermoelectric module comprises an array of thermocouples consisting of P and N type thermoelectric elements electrically and thermally insulated from each other, a cold plate disposed in thermal contact to an interior side of said thermoelectric elements, a hot plate disposed in thermal contact to an exterior side of said thermoelectric elements, a refrigerant conduit disposed in thermal contact with said cold plate, and an array of heat sink fins circumferentially attached to said hot plate.

5. An improvement in a vapor-compression-cycle refrigeration system as in claim 4 further including condensing temperature control means.

6. An improvement in a vapor-compression-cycle refrigeration system as in claim 5 wherein said condensing temperature control means comprises a thermostat well for receipt of a thermostat probe, said thermostat well extending approximately to the center of said refrigerant conduit.

7. An improvement in a vapor-compression-cycle refrigeration system as in claim 5 wherein said condensing temperature control means comprises a hot gas by-pass assembly disposed between said compressor and said receiver.

8. An improvement in a vapor-compression-cycle refrigeration system as in claim 5 wherein said condensing temperature control means comprises a thermostat well for receipt of a thermostat probe, said thermostat well extending approximately to the center of said refrigerant conduit, in combination with a hot gas by-pass assembly disposed between said compressor and said evaporator.

9. A vapor-compression-cycle refrigeration system comprising an evaporator coil;

a compressor;

a Peltier condenser, said Peltier condenser comprising (a) a selectively removable shroud having an open top end and an open bottom end, (b) a draft fan driven by a draft fan motor attached to a top wall of said shroud, (c) a potentiometer thermostat disposed on an outside portion of said shroud, and (d) a thermoelectric module disposed in an interior portion of said shroud, said thermoelectric module comprising an array of thermocouples consisting of P and N type thermoelectric elements electrically and thermally insulated from each other, a cold plate disposed adjacent to the cold juncture of said array of thermoelectric elements, a hot plate disposed adjacent to the hot juncture of said array of thermoelectric elements, a plurality of heat sink fins disposed adjacent to said hot plate opposite to said thermoelectric elements, and a spiraled refrigerant conduit disposed in thermal contact along its length with said cold plate opposite to said thermoelectric elements; and an expansion valve, said evaporator coil, compressor, Peltier condenser and expansion valve being connected in series.

10. A vapor-compression-cycle refrigeration system as in claim 9 further including a remote condenser power supply.

11. A vapor-compression-cycle refrigeration system comprising an evaporator coil;

a compressor;

a Peltier condenser, said Peltier condenser comprising a step-down transformer connected in series to a rectifier, said rectifier being connected in series to a potentiometer thermostat and a finned thermoelectric module, and a draft fan disposed adjacent to fins of said thermoelectric module; and an expansion valve, said evaporator coil, compressor, Peltier condenser and expansion valve being connected in series.

12. A vapor-compression-cycle refrigeration system comprising an evaporator coil;

a compressor;

a Peltier condenser, said Peltier condenser comprising (a) a free-standing shell having a gaseous refrigerant inlet formed in an upper portion of a side wall of the shell and a condensate outlet formed in a bottom wall of the shell, (b) a draft fan driven by a draft fan motor disposed in a top wall of the shell, (c) an electrical control box disposed on a side wall of the shell, said shell housing a transformer, a rectifier, a potentiometer thermostat and other electrical wiring and control circuitry, and (d) a thermoelectric module disposed in an interior portion of the shell; and an expansion valve, said evaporator coil, compressor, Peltier condenser and expansion valve being connected in series.

13. A vapor-compression-cycle refrigeration system as in claim 12 wherein said thermoelectric module comprises an array of thermocouples consisting of P and N type thermoelectric elements electrically and thermally insulated from each other, a cold plate disposed in thermal contact to an interior side of said thermoelectric elements, a hot plate disposed in thermal contact to an exterior side of said thermoelectric elements, a refrigerant conduit disposed in thermal contact with said cold plate, and an array of heat sink fins circumferentially attached to said hot plate.

14. A vapor-compression-cycle refrigeration system as in claim 13 further including condensing temperature control means.

* * * * *